United States Patent Office 3,259,769
Patented July 5, 1966

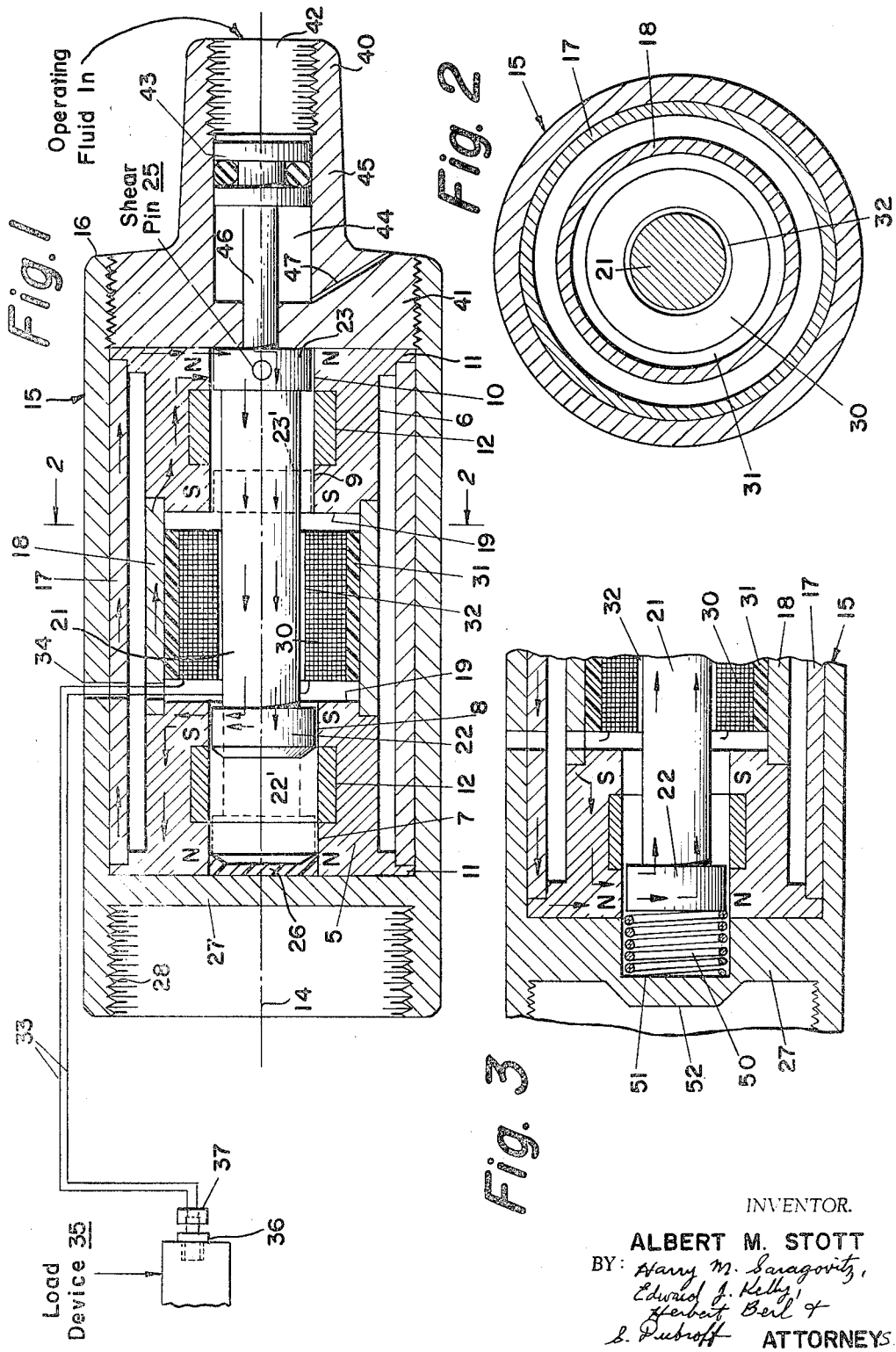

3,259,769
ELECTRICAL PULSE GENERATOR
Albert M. Stott, Southampton, Pa., assignor to United States of America as represented by the Secretary of the Army
Filed Jan. 30, 1964, Ser. No. 341,470
8 Claims. (Cl. 310—14)

The invention described herein may be manufactured and used by or for the Government for governmental purposes without the payment to me of any royalty thereon.

The present invention relates to electro-mechanical energy converters or generators of the type adapted for converting high-magnitude input impulses of mechanical energy into peak output pulses of electrical energy.

More particularly, the present invention relates to electrical pulse generators of the type referred to, wherein a movable armature element is mechanically subjected to rapidly-applied loading and resultant highly-accelerated motion of short time duration to produce output energy in the form of a current or voltage pulse of relatively-high amplitude for actuating electrical ignition and pulse-operated devices.

Electrical pulse generators of this type are generally manually operated and utilize rotating or pivoting armature elements inherently not adapted for the extremely rapid movement required for maximum amplitude in the pulse output. In addition, the construction is necessarily such that simplification, and size and cost reduction, are not generally feasible.

Accordingly, it is a primary object of this invention to provide an improved electrical pulse generator of the electro-mechanical energy-converter type which may operate with more effective armature movement and higher pulse output, and by remote control and fluid pressure for the direct production of such armature movement.

It is also a further object of this invention to provide an improved electrical pulse generator of the above type that can be constructed and readily assembled from simplified, relatively-low-cost parts and includes an improved magnetic circuit and armature element adapted for high energy conversion and output.

In accordance with one form of the invention, the improved electrical pulse generator is of circular or cylindrical configuration with the several operative and structural elements thereof arranged along and concentric relation to a common longitudinal axis. A relatively strong magnetic field is established along this central axis and within the field an elongated, plunger-type armature, preferably of round cross-section, is positioned and guided to provide rapid axial travel along the axis concentrically therewith. A pickup coil or generator output winding closely surrounds the armature and is fixed between two cylindrical or annular-ring type permanent magnets through which a smooth bore is provided as guide means for the armature as it moves.

The magnets are axially polarized and provided with internal annular pole pieces or elements which contact the armature for flux translation therethrough in rapidly-shifted opposite directions as the armature moves axially from a position of rest to a second or stop position in response to applied mechanical force. The sudden reversal of the highly-concentrated magnetic field within the armature, serving as the core of the pickup coil or generator winding, produces a strong electromotive force in the latter, and a resultant high electrical energy output therefrom. This is applied to utilization means through a suitable output circuit.

The magnets are of duplicate construction for low-cost manufacture in quantity production, and are mounted in reverse polarity relation at opposite ends of the output coil or winding, whereby the external magnetic circuit may be completed by two spaced concentric sleeves of magnetic material extending between the magnets and connecting polar ends of like polarity in each case.

The assembly of the above elements is thus adapted for mounting in a cylindrical casing or chamber through one open end which may be closed by suitable means such as a screw-threaded cap or plug to hold the assembly in place. Power-operated or other means may be provided to mechanically drive the armature with the desired operating impulse. Preferably the armature is connected with means for suddenly applying a moving force or load thereto of full operating magnitude through the release of a shear pin or the like. The plunger-type armature with rapid rectilinear or straight-line travel is well adapted for applications involving the use of propellant gas in piston-and-cylinder means connected therewith. The rapidity of motion attained produces a correspondingly greater output pulse than present pivoting and rotating-armature type generators.

The invention will further be understood from the following description, when considered with reference to the accompanying drawing, and its scope is pointed out in the appended claims.

In the drawing, FIG. 1 is a cross-sectional view, in elevation, of an electrical pulse generator embodying the invention, FIG. 2 is a further sectional view, taken on section line 2—2 of FIG. 1, of the said electrical pulse generator further showing the concentric relation of the operative and structural elements thereof in accordance with the invention, and FIG. 3 is a cross-sectional view, in elevation, of a portion of the electrical pulse generator of FIG. 1, showing a modification thereof, further in accordance with the invention.

Referring to the drawing, wherein like elements throughout the several figures are designated by like reference numerals, and referring more particularly to FIGS. 1 and 2, the pulse generator comprises two cylindrical or annular-ring permanent magnets 5 and 6 having inner spaced annular pole elements or pole pieces 7 and 8, and 9 and 10, respectively, of which the pole pieces 7 and 10 and 8 and 9 are of like polarities. In the present example, the pole pieces 7 and 10 may be considered to be of North polarity, as indicated, and the pole pieces 8 and 9 may be considered to be of South polarity, also as indicated.

The magnets 5 and 6 are of duplicate construction preferably, for production manufacture in large quantities, and are preferably made of a magnetic material adapted to take and retain a high permanent flux density, such as commercially-known Alnico of a high grade. Each is provided with an outer radial flange 11 at one end and ring elements 12 filling the space between the annular pole pieces 7 and 8, and 9 and 10. The filler ring elements 12 are bored to the same diameter as the pole pieces and area of non-magnetic material, such as aluminum, for example.

The magnets 5 and 6 are mounted in coaxial spaced relation along and in common with the longitudinal axis 14 of the cylindrical housing or casing 15 for the generator, being inserted in one screw-threaded open end 16 thereof. The magnets are magnetically coupled and spaced by two concentric outer sleeves 17 and 18 located respectively between the flanges 11 and the adjacent or inner faces 19 of the magnets, both of which are stepped to provide positioning means therefor. These are of soft iron or other highly permeable magnetic material. The magnets 5 and 6 are mounted with the flanges 11 at the outer end of the assembly and the magnet poles 7–8 and 9–10 in reverse polarity relation along the axis 14, as indicated. Thus like poles or polar ends are connected externally through the sleeves 17 and 18, for reasons which will hereinafter be pointed out.

Extending along the axis 14 between the two spaced magnets 5 and 6, and unlike poles thereof, as between the poles 8 and 10 in the present example, is a central movable armature element or plunger 21. This is provided with enlarged head ends 22 and 23 which contact the poles and move with a smooth sliding fit in the bores of the respective magnets 5 and 6 which include the filler ring elements 12 of the same internal diameter as the pole pieces with which they are associated. This is normal retracted position of rest for the armature element which is preferably of soft iron or like easily-permeable material. It provides a bridging flux between the North pole 10 of the magnet 6 and the South pole 8 of the magnet 5 along the axis 14. The magnetic circuit from magnet to magnet through the armature 21 is continued and completed through the two coaxial outer conductive sleeves 17 and 18 and flux flow effectively in two parallel paths therethrough and through the armature is indicated by the arrowed lines. While being effectively in tandem relation along the axis, the magnets are effectively magnetically in parallel.

The armature element 21 is held in the retracted position shown, by suitable means which will release under pressure or force applied to the armature element along the axis 14 to move it from this position, or to the left as viewed in FIG. 1. Thus in the present example it is held by a shear pin 25 at a fixed pole contact position. In operation, the armature is acted upon by a suddenly-applied load and the pin is sheared. The armature moves to the other limit of its travel or stop position as indicated by the dotted head positions at 22′ and 23′. The head 22 seats against a stop pad 26 shaped to conform thereto and supported by the inner end wall 27 of the housing or chamber. This end of the housing is internally threaded as indicated at 28 to provide for mounting in connection with any associated apparatus (not shown).

Between the two magnets 5 and 6, a pickup coil or generator winding 50 closely surrounds the armature in coaxial relation thereto in a cylindrical mounting ring or form 31 of insulating material. The coil is of slightly larger internal diameter than the diameter of the armature 21 to provide a good operating clearance space 32 about the armature. The winding or coil 30 is thus closely enclosed within the conductive flux path of the magnets 5 and 6, and is, therefore, subjected to a rapid and relatively heavy flux change or cutting as the armature moves a short distance axially to the stop position or other end of its travel.

In the stop position, the armature, at its head ends 22 and 23, contacts and bridges between the magnet poles 7 and 9 in reverse polarity, thereby causing a reversal of the flux flow in the armature and a strong electromotive force to be generated in the output or pickup coil. The output voltage or current is taken from the coil through any suitable circuit connection therewith, such as the output leads 33. The latter are taken through an opening 34 in the generator casing and extended as a circuit connection with utilization means such as a load device 35. This may be an explosive charge or body into which is plugged or inserted a suitable electric ignitor or detonator device 36. This is adapted to be detachably connected with the generator circuit or leads 33 as indicated by an electrical connector cap 37 therefor.

The pulse generator can be constructed to operate in response to fluid pressure which may be controlled from a remote position. The fluid pressure may be gas pressure derived from any suitable source or operation, such as gun firing operations. The plunger type armature is adapted for applications involving the use of propellant gas or other operating fluid applied directly to it to act along the axis 14. In the present example, an operating cylinder 40 is provided with an enlarged head end or flange 41 screw-threaded into the open end 16 of the generator casing 15, as effectively an integral part of the generator.

The cylinder 40 is provided with a screw-threaded fluid inlet or opening 42 which directly communicates with the operating end or face of a piston element 43 in the central bore 44 of said cylinder. The piston element is provided with a suitable sealing or ring element 45 and may directly contact or be connected with the generator armature 21 through the head end 23, as indicated, by a central axially-extending plunger or piston rod 46. Like the armature, the piston element 43 is shown in its retracted or rest position. Thus it moves to the left, as viewed in the drawing FIG. 1, when fluid pressure is admitted through the opening 42 to the cylinder 40 of a magnitude sufficient to shear the pin 25 and thus suddenly heavily to load the armature with a longitudinally-acting moving force.

The pulse generator thus converts mechanical energy into electrical energy by the sudden linear motion of a plunger type armature due to the rapid application of fluid (gas) pressure and resultant heavy mechanical loading along the axis of movement. Basically further, the pulse generator of the present invention provides from two spaced magnets in parallel, a strong magnetic field along a central axis of the generator within which the plunger type armature moves. The armature is positioned and guided for rapid axial travel between pairs of longitudinally-spaced unlike poles in two annular ring-type permanent magnets with internal annular pole pieces.

The cylinder 40 is provided with pressure relief openings of which one is indicated at 47, for the back space in the chamber or bore 44 sufficient to permit rapid operating movement of the piston element and its return to the retracted position by reduction of pressure at the inlet below atmospheric pressure. For repeated operation at inlet pressures above atmospheric and with or without the loading control provided by the shear pin operation, the generator may be modified as shown in FIG. 3 to which attention is directed along with FIGS. 1 and 2.

In the modification of FIG. 3, a coiled return spring 50 of the compression type is provided to restore the armature to the retracted position. The spring is sealed in an axially-extending well or recess 51 in the inner end wall 27 of the casing which is thickened and centrally bossed as indicated at 52. This provides a depth sufficient to receive the full-compressed spring as the armature moves to the stop position shown, and the flux shift is as indicated by the arrowed flux lines. The return spring also permits a repeat action to be applied to the armature for repeated output pulses of a magnitude determined by the rapidity of movement of the armature in response to the applied fluid operating pressure. The construction in the modification is otherwise the same as shown and described in connection with FIGS. 1 and 2.

A pulse generator embodying the invention is adapted for applications involving the use of propellant gas or other fluid under pressure to apply a load to a plunger-type armature and provide rapid axial travel and high pulse output from a closely-coupled pickup coil or generator winding. A high degree of reliability in firing electrical ignition elements and detonators is thus provided, along with remote control operation where desired. In addition, such pulse generating means may provide either a primary or stand-by source of operating pulse energy, and replace stored electrical energy (battery) sources with the field maintenance problems involved.

I claim:

1. An electrical pulse generator for converting input pulses of mechanical energy into output pulses of electrical energy, comprising in combination, a longitudinally-movable plunger-type armature, a pair of annular-ring permanent magnets at opposite ends of and coaxial with said armature providing two pairs of longitudinally-spaced unlike poles with the armature in a retracted position bridging one pair in a strong magnetic field, said magnets further providing means for positioning and guiding said armature in its movement, fluid-pressure operated means in driving connection with the armature for imparting thereto sudden linear motion along the longitudinal axis thereof and rapid axial travel to alternatively bridge the other pair of magnet poles in opposite polarity relation, a pickup coil closely surrounding the armature between said magnets for deriving electrical pulse output from said generator in response to said armature movement, means connected with the armature for with-holding movement thereof in response to fluid pressure application below a predetermined magnitude, and means providing spaced internal annular pole pieces for said magnets with interposed rings of non-magnetic material having a common internal diameter of the armature with a sliding fit.

2. An electrical pulse generator for converting input pulses of mechanical energy into output pulses of electrical energy, comprising in combination, a longitudinally-movable plunger-type armature, a pair of annular-ring permanent magnets at opposite ends of and coaxial with said armature providing two pairs of longitudinally-spaced unlike poles with the armature in a retracted position bridging one pair in a strong magnetic field, said magnets further providing means for positioning and guiding said armature in its movement, means in driving connection with the armature for imparting thereto sudden linear motion along the longitudinal axis thereof and rapid axial travel to alternatively bridge the other pair of magnet poles in opposite polarity relation, a pickup coil closely surrounding the armature between said magnets for deriving electrical pulse output from said generator in response to said armature movement, and two concentric tubular sleeves of magnetic material providing flux-conductive connecting elements between the magnets and part of the magnetic circuit of the generator, said sleeves being connected effectively between like poles of said magnets.

3. An electrical pulse generator for converting input pulses of mechanical energy into output pulses of electrical energy, comprising in combination, an elongated plunger-type armature of round cross-section with enlarged head ends, a pair of coaxial longitudinally-spaced annular ring-type permanent magnets axially polarized and having internal annular pole elements which contact the armature head ends for magnetic flux translation through the armature flux path in rapidly-shifted opposite directions in response to rapid axial movement of said armature, pressure operated means connected with said armature for imparting said axial movement thereto, means for holding said armature against axial movement below a predetermined applied operating pressure, a generator winding surrounding said armature between said magnets for deriving an output electrical pulse from the generator in response to said armature movement, and two concentric cylindrical sleeves of magnetic material extending between and magnetically connecting said magnets in two flux paths external to and in continuation of the flux path through the armature.

4. An electrical pulse generator comprising in combination, a cylindrical outer casing, a round rod-like armature of the plunger type having enlarged head ends, said armature being of magnetic material and coaxial with the casing, a pair of annular-ring permanent magnets at opposite ends of and coaxial with said armature, said magnets being axially polarized with internal annular pole elements and providing two pairs of longitudinally-spaced unlike poles with the armature engaging at its ends and bridging between one pair as a conductive flux path, a pair of concentric cylindrical sleeves of magnetic material extending between and magnetically connecting said magnets in two flux paths external to and in continuation of the flux path through the armature, means connected with the armature for imparting thereto a driving force and rapid axial movement from the first bridging position to a second bridging position with the armature engaging at its ends and bridging between the other pair of longitudinally-spaced unlike poles as a conductive path for flux flow in the opposite direction, and a generator winding closely surrounding said armature between said magnets for deriving an electrical pulse output of relatively high amplitude in response to said armature movement.

5. An electrical pulse generator as defined in claim 4, wherein means are provided for holding the armature against axial movement in response to a driving force below a predetermined magnitude, thereby to insure an electrical output of relatively-high amplitude above a predetermined level.

6. An electrical pulse generator as defined in claim 4, wherein compression spring means are provided in connection with the armature for restoring said armature to the first bridging position upon release of the said driving force, thereby to place said generator in condition for repeat operation.

7. An electrical pulse generator comprising in combination, a plunger type armature movable longitudinally along a fixed axis, means having a driving connection with the armature for imparting sudden movement thereto along said axis from a first to a second position, a pickup coil surrounding said armature in spaced relation thereto between its ends, a pair of axially-polarized annular ring magnets in spaced effectively tandem relation at opposite ends of and coaxial with the armature, said magnets being of duplicate construction with inner annular pole elements of unlike polarity contacting said armature and being magnetically bridged thereby for flux flow therethrough, said magnets further being mounted in polarity relation along said axis to effect reversal of said flux flow in response to movement of the armature from said first to said second position and an electrical pulse output from said coil, and two substantially concentric magnetically-conductive sleeve elements in coaxial relation to the armature connecting said magnets effectively in parallel relation magnetically for increased flux flow through the armature and higher pulse output.

8. An electrical pulse generator as defined in claim 7, wherein means are provided for moving the armature from the second to the first position automatically following operation by the first-named means through said driving connection.

References Cited by the Examiner
UNITED STATES PATENTS

| 2,362,151 | 11/1944 | Ostenburg | 310—15 X |
| 3,103,603 | 9/1963 | Reutter | 310—30 |
| 3,116,428 | 12/1963 | Blodgett et al. | 310—15 |
| 3,130,332 | 4/1964 | Zehfeld et al. | 310—15 |
| 3,153,735 | 10/1964 | Branagan et al. | 310—15 |

FOREIGN PATENTS

| 1,130,451 | 9/1956 | France. |

MILTON O. HIRSHFIELD, *Primary Examiner.*

D. F. DUGGAN, *Assistant Examiner.*